United States Patent [19]

Hidaka et al.

[11] Patent Number: 5,425,086
[45] Date of Patent: Jun. 13, 1995

[54] LOAD CONTROL SYSTEM FOR CONTROLLING A PLURALITY OF PROCESSES AND EXCHANGE SYSTEM HAVING LOAD CONTROL SYSTEM

[75] Inventors: Takashi Hidaka; Yoshihiro Kaneko, both of Kawasaki, Japan

[73] Assignee: Fujitsu Limited, Kawasaki, Japan

[21] Appl. No.: 945,957

[22] Filed: Sep. 16, 1992

[30] Foreign Application Priority Data

Sep. 18, 1991 [JP] Japan .................................. 3-237727
Oct. 25, 1991 [JP] Japan .................................. 3-279299

[51] Int. Cl.⁶ ..................... H04M 15/00; H04M 3/22; H04M 7/00
[52] U.S. Cl. ....................................... 379/113; 379/34; 379/139; 379/220; 379/230
[58] Field of Search ................. 379/34, 111, 112, 113, 379/133, 134, 137, 139, 207, 219, 220, 230, 265, 266, 309, 221

[56] References Cited

U.S. PATENT DOCUMENTS 4,613,729  9/1986  Daisenberger ....................... 379/113
4,802,205  1/1989  Eder et al. ........................... 379/113
4,984,264  1/1991  Katsube ............................... 379/220

Primary Examiner—James L. Dwyer
Assistant Examiner—Harry S. Hong

[57] ABSTRACT

In a load control system having n types of processes provided for processing requests of an identical type, a load processing unit executes one of m types of processes among the n types of processes in response to one of the processing requests where n and m are respectively integers equal to or larger than 1 and m is equal to or smaller than n. A monitor unit periodically monitors a load of the load processing unit and selects the m types of processes from among the n types of processes on the basis of the load of the load processing unit. An execution ratio calculation unit determines execution ratios of the m types of processes so that the load of the load processing unit is equal to or lower than a first reference value and an execution ratio of at least one of the types of processes is equal to or higher than a second reference value. The load processing unit executes the m types of processes in response to the processing requests with the execution ratios of the m types of processes.

16 Claims, 14 Drawing Sheets

PRIORITY: 1 > 2 > 3 > 4 > ⋯ > n

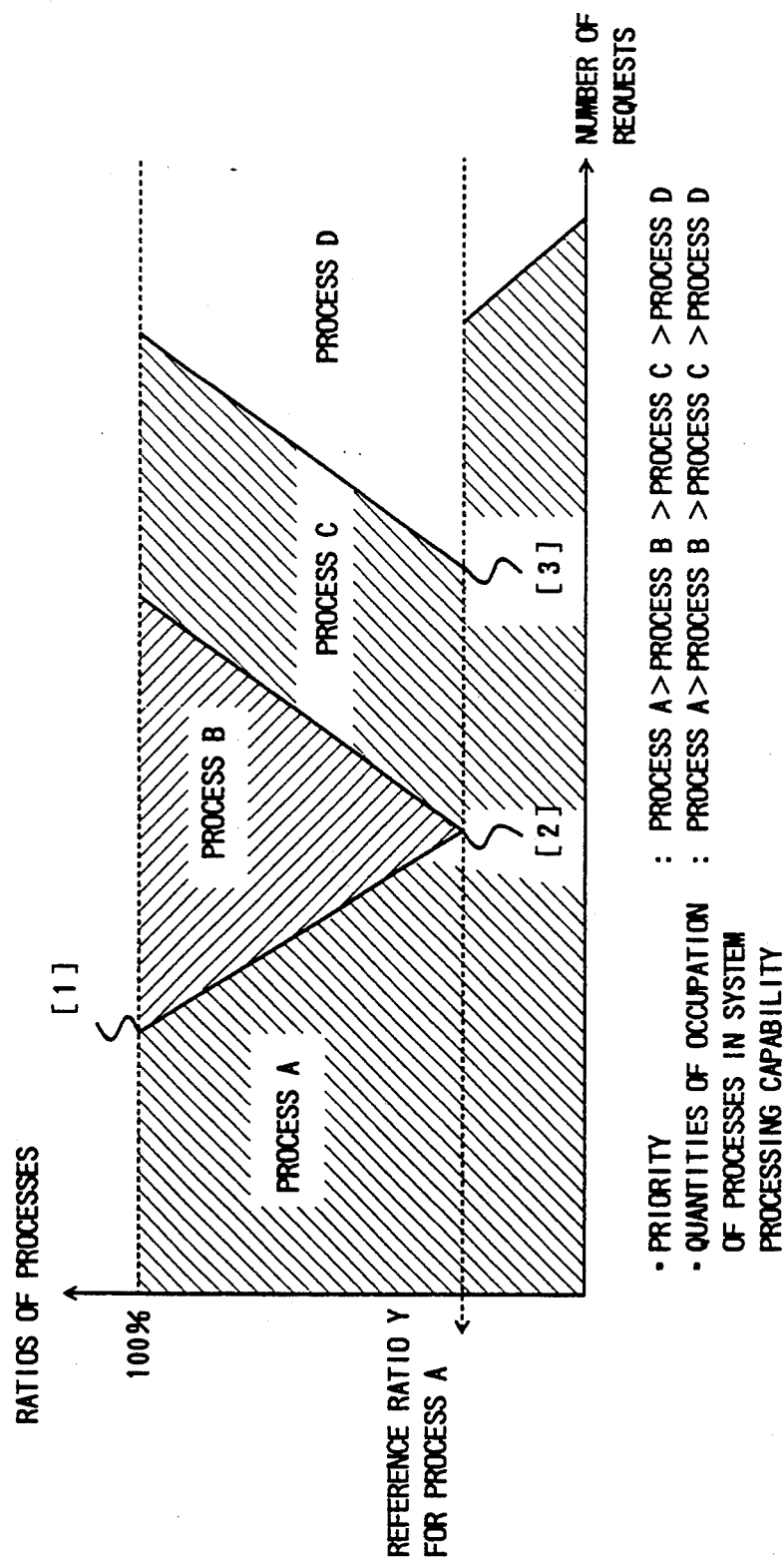

F I G. 8
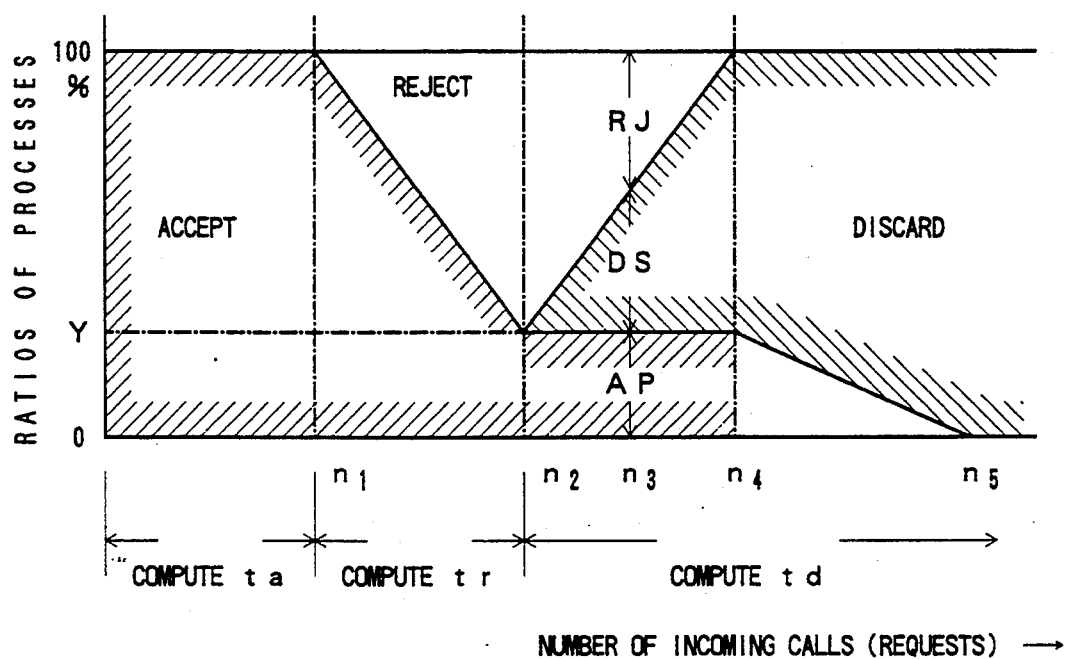

F I G. 9
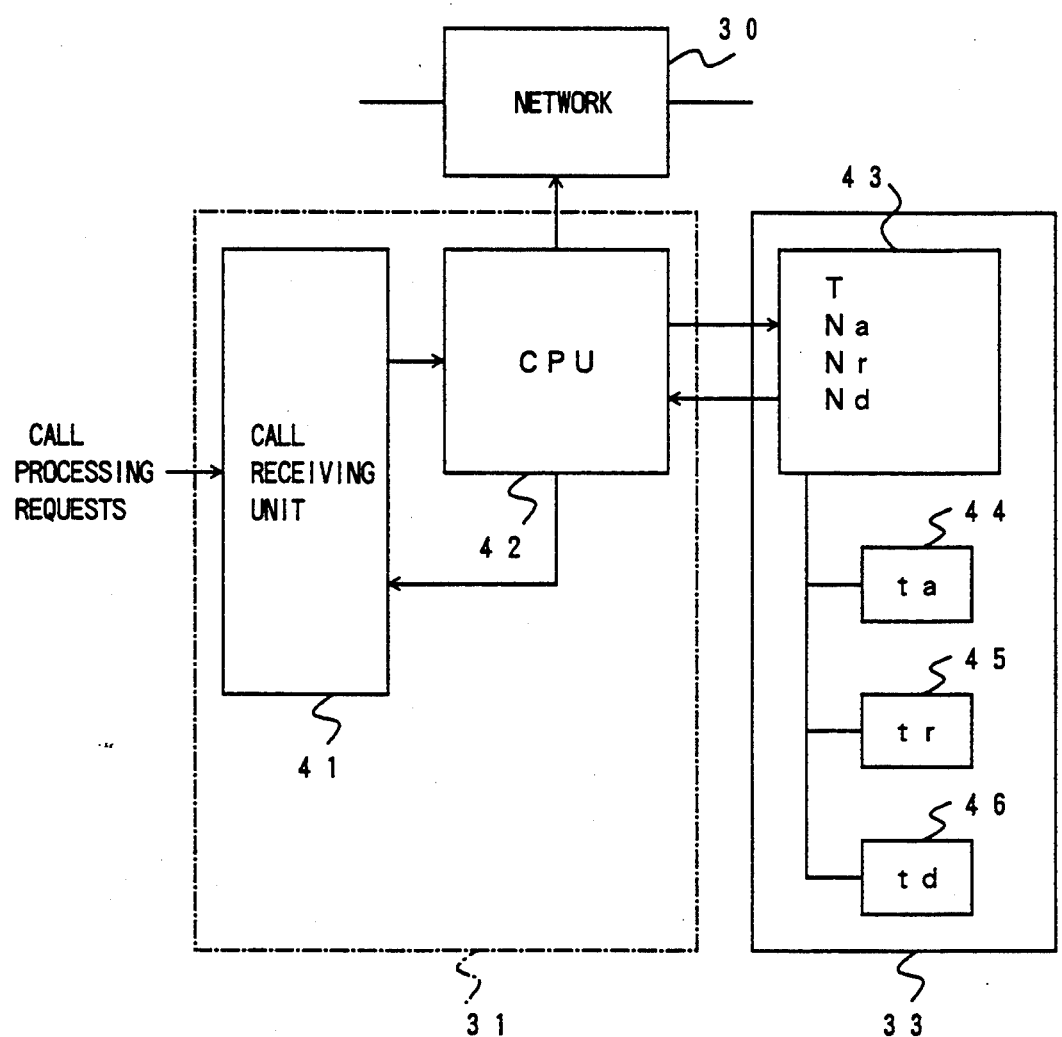

LOAD CONTROL SYSTEM FOR CONTROLLING A PLURALITY OF PROCESSES AND EXCHANGE SYSTEM HAVING LOAD CONTROL SYSTEM

BACKGROUND OF THE INVENTION

1. Field of the Invention

The present invention generally relates to a load control system for controlling a plurality of processes, and more particularly a load control system included in a switching system, such as an exchange system having a plurality of processes for incoming calls.

2. Description of the Prior Art

FIG. 1 is a graph showing how incoming calls are regulated by a conventional load control system of an exchange system shown in FIG. 2A. The horizontal axis of the graph of FIG. 1 represents the number of incoming calls, and the vertical axis thereof represents the rate of accepted calls to the incoming calls. FIG. 2B is a flowchart showing the operation of the conventional load control system shown in FIG. 2A.

The conventional load control system has two types of processes for incoming calls, one of which is a call acceptance process, and the other one of which is a call regulation process. A call processing unit 2 of a processing unit 1 shown in FIG. 2A receives an incoming call received from a calling station or a called station in step S1 shown in FIG. 2B. In step S2, the call processing unit 2 increments the value of a counter for counting the number of incoming calls by 1. The call processing unit 2 receives data indicative of a call regulation rate from a regulation processing unit 3 of the processing unit 1, and determines, in step S3, whether or not the received call should be accepted by referring to the call regulation rate data.

In step S6, a load state monitoring unit 4 of the exchange system periodically monitors the state of a system load which shows, for example, how frequently the processing unit 1 of the exchange system is used for processing incoming calls. The load state monitoring unit 4 is externally provided with a parameter A representing an upper load limit, while the unit 4 periodically reads data indicating the system load state in step S7. In step S8, the load state monitoring unit 4 compares the upper load limit with the data indicating the system load state, and determines whether or not the processing unit 1 has an overload. When it is determined that the processing unit 1 is operating with a normal, the process ends. When it is determined, in step S8, that the processing unit 1 has an overload, the load state monitoring unit 4 updates, in step S9, the call regulation rate to be used in the next cycle. In step S3, the updated call regulation rate is used when the next incoming call is processed.

Referring to FIG. 1, the call regulation process is started when the number of incoming calls has reached a point "a", and all incoming calls are regulated (not accepted) when the number of incoming calls has reached a point "b". The number of accepted calls is gradually decreased as the number of incoming calls increases between the points "a" and "b" When the number of incoming calls exceeds the point "b", the call acceptance process is not carried out at all. This substantially degrades the communications services.

SUMMARY OF THE INVENTION

It is a general object of the present invention to provide a load control system for controlling a plurality of processes in which the above disadvantage is eliminated.

A more specific object of the present invention is to provide a load control system for an exchange system capable of efficiently accepting incoming calls within a suitable load range without excessively performing processes other than the call acceptance process.

The above objects of the present invention are achieved by a load control system having n types of processes provided for processing requests of an identical type, the load control system comprising: load processing means for executing one of m types of processes among the n types of processes in response to one of the processing requests where n and m are respectively integers equal to or larger than 1 and m is equal to or smaller than n; monitor means, coupled to the load processing means, for periodically monitoring a load of the load processing means and for selecting the m types of processes from among the n types of processes on the basis of the load of the load processing means; and execution ratio calculation means, coupled to the load processing means and the monitor means, for determining execution ratios of the m types of processes so that the load of the load processing means is equal to or lower than a first reference value and an execution ratio of at least one of the types of processes is equal to or higher than a second reference value, the load processing means executing the m types of processes in response to the processing requests with the execution ratios of the m types of processes.

Another object of the present invention is to provide an exchange system using the above load processing system.

This object of the present invention is achieved by an exchange system having n types of processes provided for call processing requests, the load control system comprising: load processing means for executing one of m types of call processes among the n types of call processes in response to one of the call processing requests where n and m are respectively integers equal to or larger than 1 and m is equal to or smaller than n; monitor means, coupled to the lead processing means, for periodically monitoring a load of the load processing means and for selecting the m types of call processes from among the n types of processes on the basis of the lead of the lead processing means; and execution ratio calculation means, coupled to the lead processing means and the monitor means, for determining execution ratios of the m types of call processes so that the lead of the lead processing means is equal to or lower than a first reference value and an execution ratio of at least one of the types of call processes is equal to or higher than a second reference value, the lead processing means executing the m types of call processes in response to the processing requests with the execution ratios of the m types of call processes.

BRIEF DESCRIPTION OF THE DRAWINGS

Other objects, features and advantages of the present invention will become more apparent from the following detailed description when read in conjunction with the accompanying drawings, in which;

FIG. 4 is a diagram illustrating how the processes are controlled by the load control system;

FIG. 8 is a diagram showing a process for calculating average processor operation times;

FIG. 9 is a block diagram of a hardware structure for executing the process shown in FIG. 8;

DESCRIPTION OF THE PREFERRED EMBODIMENTS

Figure 1:
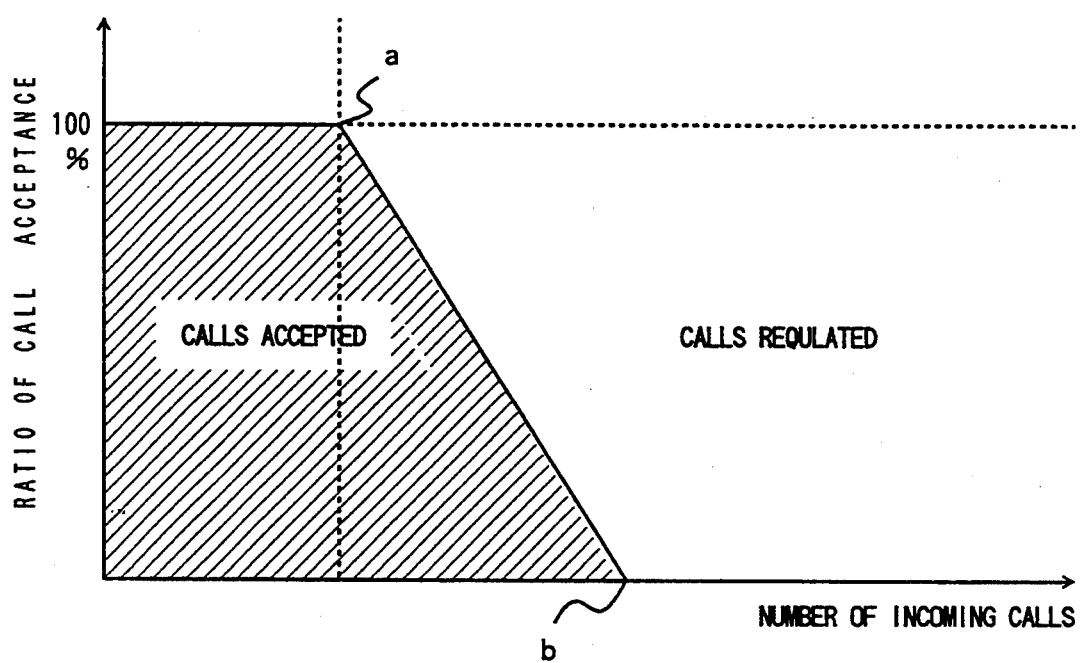
FIG. 1 is a graph showing how incoming calls are processed by means of a conventional load control system.
Figure 2A:
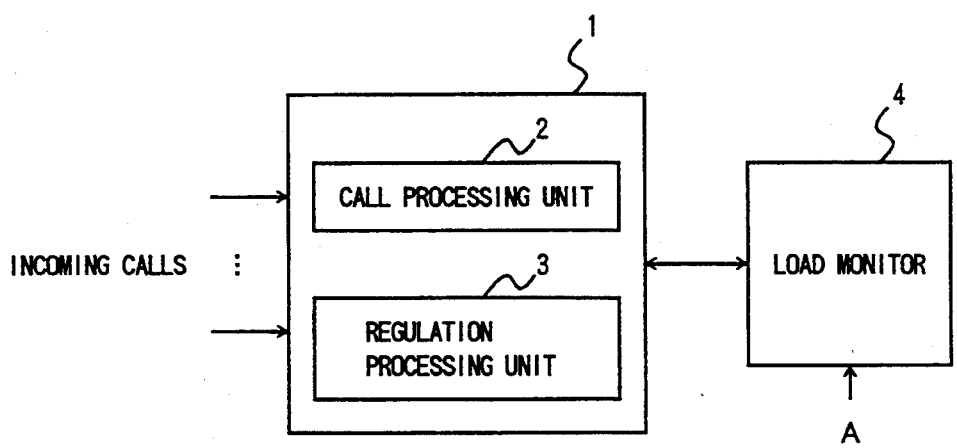
FIG. 2A is a block diagram of a convention load control system of an exchange system.
Figure 2B:
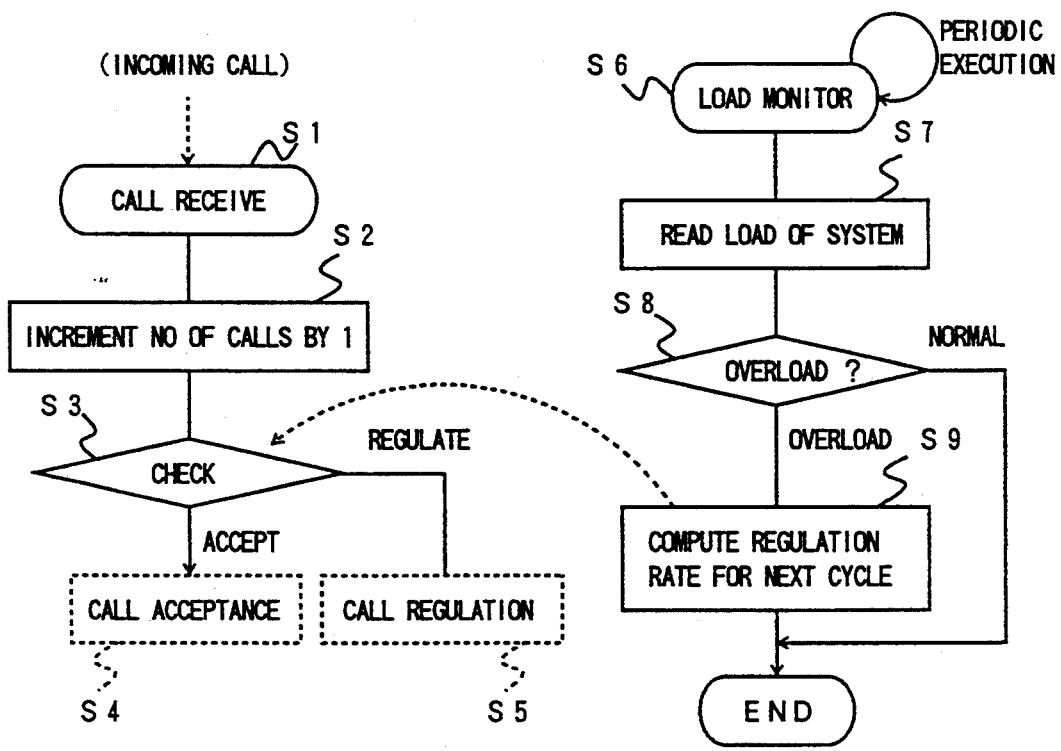
FIG. 2B is a flowchart of a conventional lead control process.
Figure 3A:
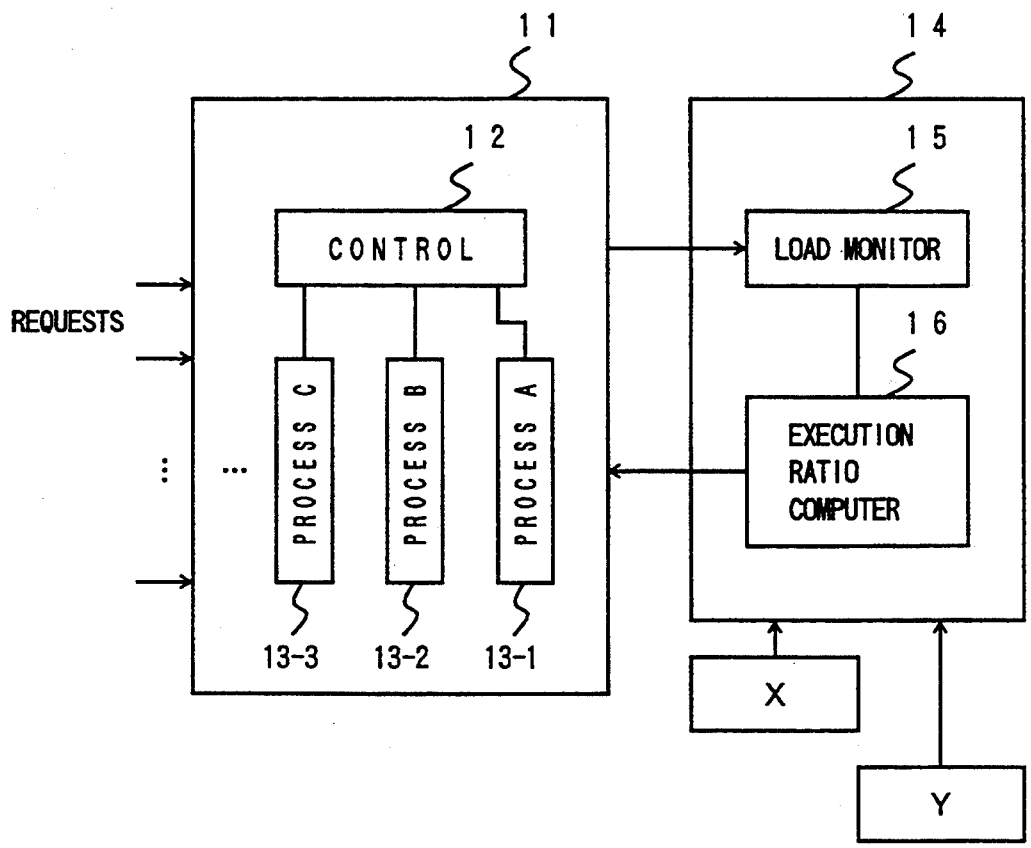
FIG. 3A is a block diagram showing an overview of a load control system according to an embodiment of the present invention.
Figure 3B:
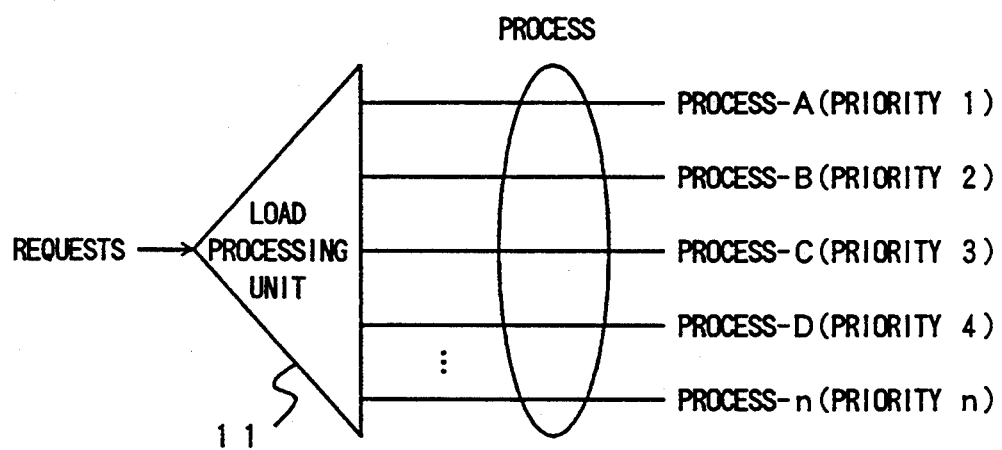
FIG. 3B is a diagram showing a relationship among a plurality of processes handled by the load control system shown in FIG. 3A.

FIG. 3A is a block diagram showing an overview of a load control system according to an embodiment of the present invention. FIG. 3B is a diagram showing the relationship among a plurality of types of processes executed in the exchange system shown in FIG. 3A.

The load control system shown in FIG. 3A comprises a load processing unit 11, and a load monitoring control unit 14. The load control unit 11 comprises a controller 12, which selectively executes a plurality of processes (types) A, B, C, .... The load monitoring control unit 14 comprises a load state monitor 15, and an execution ratio computer 16.

The load state monitor 15 periodically monitors a total load of the load processing unit 11 (such a total load is also referred to as a system load). The load of the load processing unit 11 corresponds to, for example, the time necessary to complete a process. The execution ratio computer 16 is notified of the system load monitored by the load state monitor 15, while it is externally notified of a reference value (maximum allowable load quantity) X of the system load. The execution ratio is defined as a ratio(s) of a specific one or a plurality of types of processes to a predetermined system load. The execution ratio computer 16 is externally informed of a reference value Y of the execution ratio.

The execution ratio computer 16 computes the execution ratio on the basis of the following criteria.

(1) The system load must be equal to or smaller than the reference value X.

(2) The execution ratio of one or a plurality of process types to the predetermined system load is determined so that it is equal to or larger than the reference value Y.

(3) Execution priority is given to each of the process types, and the execution ratio is determined so that processes having relatively high priority levels are executed as much as possible.

The controller 12 is informed of the execution ratio thus computed by the execution ratio computer 16, and selectively handles requests for execution of processes so that the above-mentioned three criteria are satisfied.

FIG. 3B shows a priority order which defines the relationship among the priority levels of the processes (types) A, B, C, ..., n, in which the process type A has the highest priority over the other processes, the process B has the second highest priority, and the process n has the lowest priority. The execution ratio computer 16 selects one or a plurality of process types and calculates the execution ratio. The controller 12 of the load processing unit 11 executes the processes in accordance with the execution ratio calculated by the execution ratio computer 16.

FIG. 4 is a graph of the execution ratios of the processes A-D. The horizontal axis of the graph shown in FIG. 4 denotes the number of processes requested, and the vertical axis thereof denotes the system load. In the example shown in FIG. 4, the reference Y of the execution ratio of the specific process A is defined. While a relatively small number of requested processes is received, only the process A having the highest priority level is executed. When the number of requested processes has reached a point [1], it is determined that the system load has become equal to the reference value X. Hence, the process B having the second priority level is executed while the process A continues to be executed. The execution ratios of the processes A and B are determined on the basis of the number of requested processes.

If the system load increases in the above state, and the ratio of the process A reaches the reference ratio Y of the process A at point [2], it becomes impossible to keep the execution ratio of the process A equal to or higher than the reference ratio Y in the state where the processes A and B are processed. Hence, the process C is allowed to be executed in parallel with the processes A and B so that the system load is equal to the reference value X and the execution ratio of the process A is equal to or higher than the reference ratio Y. The execution ratio of the process B and the execution ratio of the process C are determined on the basis of the number of requested processes.

If the system load further increases in the above state, and the above condition where the system load is equal to the reference value X and the execution ratio of the process A is equal to or higher than the reference ratio Y cannot be satisfied, the process B is not allowed to be executed, and the process D having the fourth priority level is allowed be executed in lieu of the process B. Hence, the processes A, C and D are executed in parallel thereto.

Figure 5:
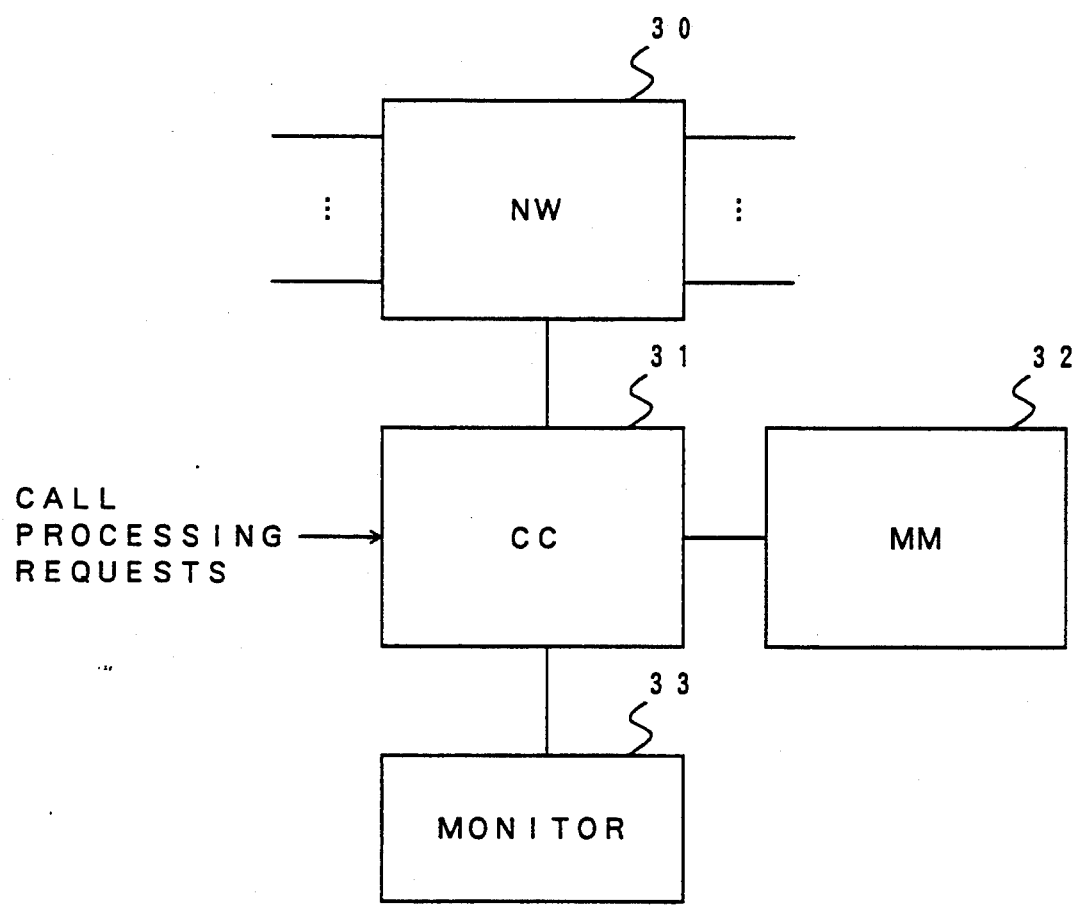
FIG. 5 is a block diagram showing an overview of an exchange system to which the present invention is applied.

FIG. 5 is a block diagram of an exchange system to which the present invention is applied. The exchange system shown in FIG. 5 comprises a network (NW) 30, a central processing unit (CC; hereinafter simply referred to as a processor) 31, a main memory (MM) 32, and a monitor unit 33. A plurality of subscriber lines or transmission lines connected to other exchange systems are connected to the network 30. The processor 31 controls transmission and reception of call control information or other information with respect to the subscriber lines and the transmission lines, and controls switching of the network 30. The load state of the exchange system, that is, the load of the processor 31 is monitored by the monitor unit 33, which has the functions of both the load state monitor 15 and the execution ratio computer 16. More particularly, the monitor unit 33 periodically gathers information concerning the state of the processor 31, the number of calls requested for processing applied to the processor 31, the number of calls which has been completed, and the number of calls for each of the processes, and determines which process types should be selected or executed. Then, the monitor unit 33 periodically generates a control output signal indicating the execution ratios of the process types selected.

The present embodiment of the present invention has three different types of processes. The first process type is a call acceptance process, and the other two process types are call regulation processes, one of which processes is a call rejecting process, and the other one of which processes is a call discarding process. The call rejecting process notifies a station which generates a request for processing a call that the call acceptance process has been regulated. For example, a busy tone signal or a message is sent to the station which generates a request for call processing. The call discarding process discards a request for processing a call without notification of the regulation of the call acceptance process.

In the present invention, the load state of the exchange system corresponds to the time it takes the processor 31 to process the requests. The monitor unit 33 gathers the aforementioned information at intervals of, for example, four seconds. The monitor unit 33 has first information indicating the upper limit X of the load of the processor 31, and second information indicating the lower limit Y of the rate of accepted calls to all the calls. That is, the first information is related to the rate of operation of the processor 31, and the second information is related to the ratio of acceptance of calls. The monitor unit 33 executes the regulation control so that the rate of operation of the unit 33 is prevented from exceeding the upper limit X, and concurrently the rate of acceptance of call is prevented from becoming lower than the lower limit Y.

In this case, the following decision is made based on various pieces of data including the rate of operation of the processor 31 obtained from the data gathered by the monitor unit 33. In order to keep the rate of operation of the processor 31 lower than the upper limit X, the ratio of the number of calls accepted, the number of calls rejected and the number of calls discarded is adjusted. The suitable case is such that the rate of operation of the processor 31 is lower than the upper limit under the condition that the number of calls rejected is zero and the number of calls discarded is also zero. If the rate of operation of the processor 31 is equal to or higher than the upper limit X under the above-mentioned condition, the ratios of the process types are adjusted in the following three manners so that the rate of operation of the processor 31 is equal to the upper limit X.

(1) Calls are not discarded so long as the rate of acceptance of calls is higher than the lower limit Y.

(2) If the condition that the rate of acceptance of calls is higher than the lower limit Y is not satisfied, the rate of calls rejected and the rate of calls discarded are determined so that the rate of acceptance of calls is equal to B.

(3) Rejection of calls is not carried out if the condition that the rate of acceptance of calls is higher than the lower limit Y is not satisfied even under the above condition (2).

In this manner, importance is attached to the non-execution of the call discarding process rather than an improvement in the rate of acceptance of calls when the rate of acceptance of calls is equal to or higher than the lower limit Y. When the rate of acceptance of calls is lower than the lower limit Y, importance is attached to an improvement in the rate of acceptance of calls rather than the non-execution of the call discarding process.

Figure 6:
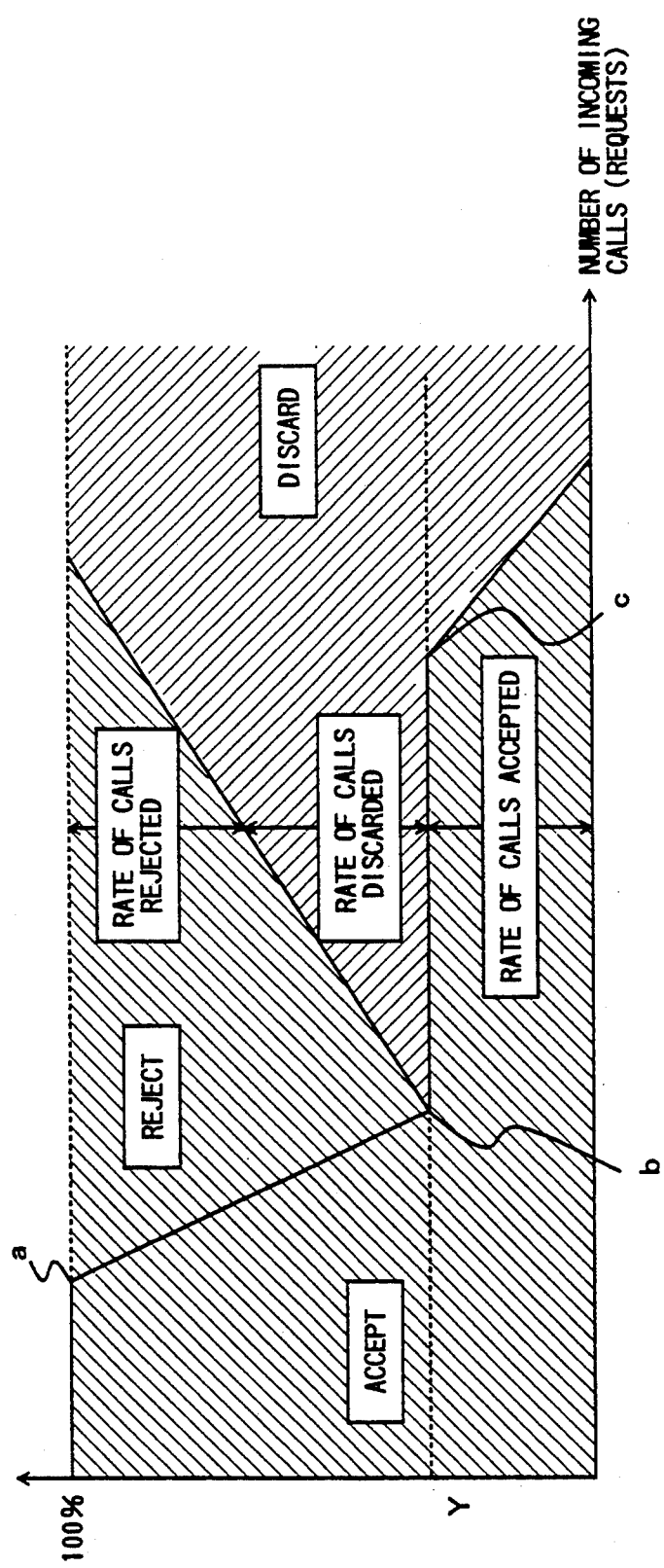
FIG. 6 is a diagram illustrating how incoming calls are processed in the exchange system shown in FIG. 5.

The ratios of the respective process types regulated according to the above-mentioned theory are shown in FIG. 6. At the point "a", the rate of operation of the processor 31 has reached the upper limit X, and hence the call rejecting process is started in addition to the call accepting process. At the point "b", the rate of calls accepted has reached the lower limit, and hence the call discarding process is started in addition to the call accepting process and the call rejecting process. When the number of incoming calls further increases and the rate of calls accepted has become lower than the lower limit Y, the call rejecting process is stopped, and only the call discarding process is carried out as the regulation process.

Figure 7:
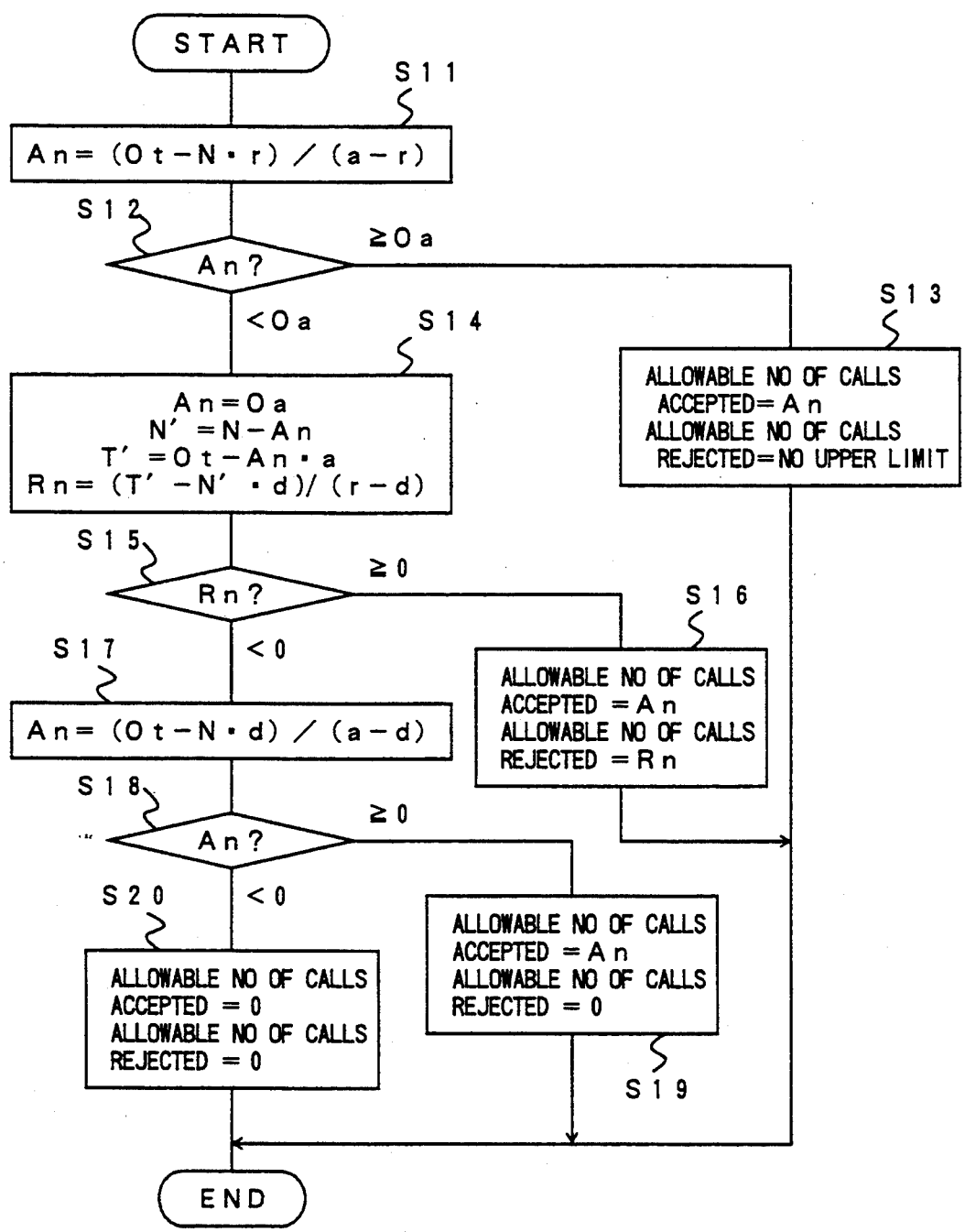
FIG. 7 is a flowchart of a process for determining ratios of execution of processes.

FIG. 7 is a flowchart showing the operation of the monitor unit 33. Various parameters used for the operation of the monitor unit 33 are stored in the main memory 32. The following parameters, which are measured by the monitor unit 33, indicate the load state of the processor 31:

N: The number of all incoming calls
T: Total processor operation time
A: The number of calls accepted
R: The number of calls rejected
D: The number of calls rejected.

The following parameters are used for the operation shown in FIG. 7:

a: (the processor operation time)/(the number of calls accepted).
b: (the processor operation time)/(the number of calls rejected)
c: (the processor operation time)/(the number of calls discarded)
Ot: target processor operation time
Oc: target rate of acceptance of calls
Oa: target number of calls accepted, which is equal to $Oc \cdot N/100$.

The following expressions are used for the operation shown in FIG. 7:

$$A+R+D=N$$

$$A \cdot a + R \cdot r + D \cdot d = T.$$

The allowable number of calls accepted, the allowable number of calls rejected and the allowable number of calls discarded, which allowable numbers are used during the next cycle, are computed under the following conditions so that $T \leq Ot$, when $R>0$, $D>0$ or $T>Ot$.

(1) The number of incoming calls which will be generated during the next cycle is estimated as the number of incoming calls which are generated during the current cycle.

(2) Only the call rejecting process is carried out for call regulation without executing the call discarding process when the rate of acceptance of calls is kept lower than Oc.

(3) When the rate of acceptance of calls is not kept lower than Oc under the condition (2), both the call rejecting process and the call discarding process are carried out so that the rate of acceptance of calls is equal to Oc.

(4) When the rate of acceptance of calls is not kept lower than Oc under the condition (3), the call rejecting process is not carried out and only the call discarding process is carried out for call regulation.

One or more process types to be executed during the next cycle and the ratio of execution thereof can be obtained during the current cycle by using the above parameters, the expressions and the conditions (1)-(4), as shown in FIG. 7.

In step S11 shown in FIG. 7, the allowable number of calls accepted during the next cycle (which allowable number is denoted as An) is calculated using the following expression so that T=Ot under an assumption that D=0:

$$An = (Ot - N \cdot r)/(a - r).$$

The monitor unit 33 determines whether or not $A \geq Oa$ in step S12. When $An \geq Oa$, that is, the number of calls accepted exceeds the target number of calls accepted, in step S13 the monitor unit 33 sets the allowable number of calls accepted during the next cycle to be equal to An, and gives no limitation to the allowable number of calls rejected. When it is determined, in step S12, that $An < Oa$, the monitor unit 33 calculates, in step S14, the allowable number of calls rejected during the next cycle by using the following expression so that T=Ot under an assumption that An=Oa:

$$Rn = (T' - N' \cdot d)/(r - d).$$

In the above expression, $T' = Ot - An \cdot a$, and $N' = N - An$. In step S15, the monitor unit 33 determines whether or not $Rn \geq 0$. When $Rn \geq 0$, in step S16 the monitor unit 33 sets the allowable number of calls accepted and the allowable number of calls rejected during the next cycle to be equal to An and Rn, respectively. When $Rn < 0$, the monitor unit 33 calculates, in step S17, the allowable number of calls accepted during the next cycle by using the following expression so that T=Ot under an assumption that Rn=0:

$$An = (Ot - N \cdot d)/(a - d).$$

In step S18, the monitor unit 33 determines whether or not $An \geq 0$. When it is determined that $An \geq 0$, the monitor unit 33 sets, in step S19, the allowable number of calls accepted and the allowable number of calls rejected during the next cycle to be equal to An and 0, respectively. When it is determined, in step S18, that $An < 0$, the monitor unit 33 sets both the allowable number of calls accepted and the allowable number of calls rejected for the next cycle to be zero in step S20.

The aforementioned parameters a (the time it takes the processor 31 to accept a call), r (the time it takes the processor 31 to reject a call) and d (the time it takes the processor 31 to discard a call) can be obtained by, for example, monitoring system loads Tn (n=1, 2, ..., n) during a plurality of cycles. The system loads T1, T2 and T3 respectively obtained during the three consecutive cycles are written as follows:

$$T1 = A1 \cdot a + R1 \cdot r + D1 \cdot d$$

$$T2 = A2 \cdot a + R2 \cdot r + D2 \cdot d$$

$$T3 = A3 \cdot a + R3 \cdot r + D3 \cdot d$$

where A1, A2 and A3 respectively denote the numbers of calls accepted, R1, R2 and R3 respectively denote the numbers of calls rejected, and D1, D2 and D3 denote the numbers of calls discarded. By solving the above simultaneous equations of the third order, it is possible to obtain the values of the parameters a, r and d as the average values thereof in the three consecutive cycles. Then, the allowable number of calls accepted, the allowable number of calls rejected, and the allowable number of calls discarded are determined so that T $(=A \cdot a + R \cdot r + D \cdot d) \leq Oc$. Hereinafter, the average values (average operation times) of the parameters a, r and d are respectively written as ta, tr and td.

However, the above procedure using the simultaneous equations is not simple. Hence, it is preferable that the average operation times ta, tr and td be calculated in the following manner, Referring to FIG. 8, when the number of incoming calls (requests for call processing) is equal to or smaller than n1, only the call accepting process is carried out, and the monitor unit 33 calculates the average operation time ta of the processor 31 necessary to accept call (request). When the number of incoming calls is between n1 and n2, both the call accepting process and the call rejecting process are carried out. At this time, the monitor unit 33 calculates the average operation time tr of the processor 31 necessary to reject one call (request). When the number of incoming calls exceeds n2, the call discarding process is carried out in addition to the call accepting and rejecting processes, and the monitor unit 33 calculates the average operation time td of the processor 31 necessary to discard one call (request).

More particularly, when the number of incoming calls is equal to or smaller than n1, Na>0, Nr=0 and Nd=0 where Na denotes the number of times that the call accepting process is carried out (Na corresponds to the aforementioned parameter A), Nr denotes the number of times that the call rejecting process is carried out (Nr corresponds to the aforementioned parameter R), and Nd denotes the number of times that the call discarding process is carried out (Nd corresponds to the aforementioned parameter D). When the number of incoming calls is equal to or smaller than n1, the average operation time ta of the processor 31 necessary to accept one call is calculated as follows:

$$ta = T/Na.$$

The average operation time ta of the processor 31 is stored in a register 44 shown in FIG. 9, in which parts which are the same as parts shown in FIG. 5 are given the same reference numerals as previously. The monitor unit 33 comprises a controller 43 and registers 44–46.

The processor-31 comprises a call receiving unit 41 and a CPU 42.

The content of the register 44 is updated by the latest average operation time ta obtained in a cycle during which only the call accepting process is carried out.

When the number of incoming calls exceeds n1, the total processor operation time will exceed the upper limit X if only the call accepting process continues to be performed. Hence, the call rejecting process is started. In this case, using the average operation time ta of the processor 31 stored in the register 44, the average operation time tr necessary for the processor 31 to reject one call is calculated by means of the following expression:

$$tr = (T - Na \cdot ta)/Nr.$$

The average operation time tr thus calculated is stored in the register 45 shown in FIG. 9. The content of the register 45 is updated by the latest average operation time tr obtained in a cycle during which both the call accepting process and the call rejecting process are carried out.

When the number of incoming calls exceeds n2, the call discarding process is started. In this case, using the average operation times ta and tr respectively stored in the registers 44 and 45, the average operation time td of the processor 31 necessary to discard one call is calculated by means of the following expression:

$$td = (T - Na \cdot ta - Nr \cdot tr)/Nd.$$

The average operation time td thus calculated is stored in the register 46 shown in FIG. 9.

Figure 10:
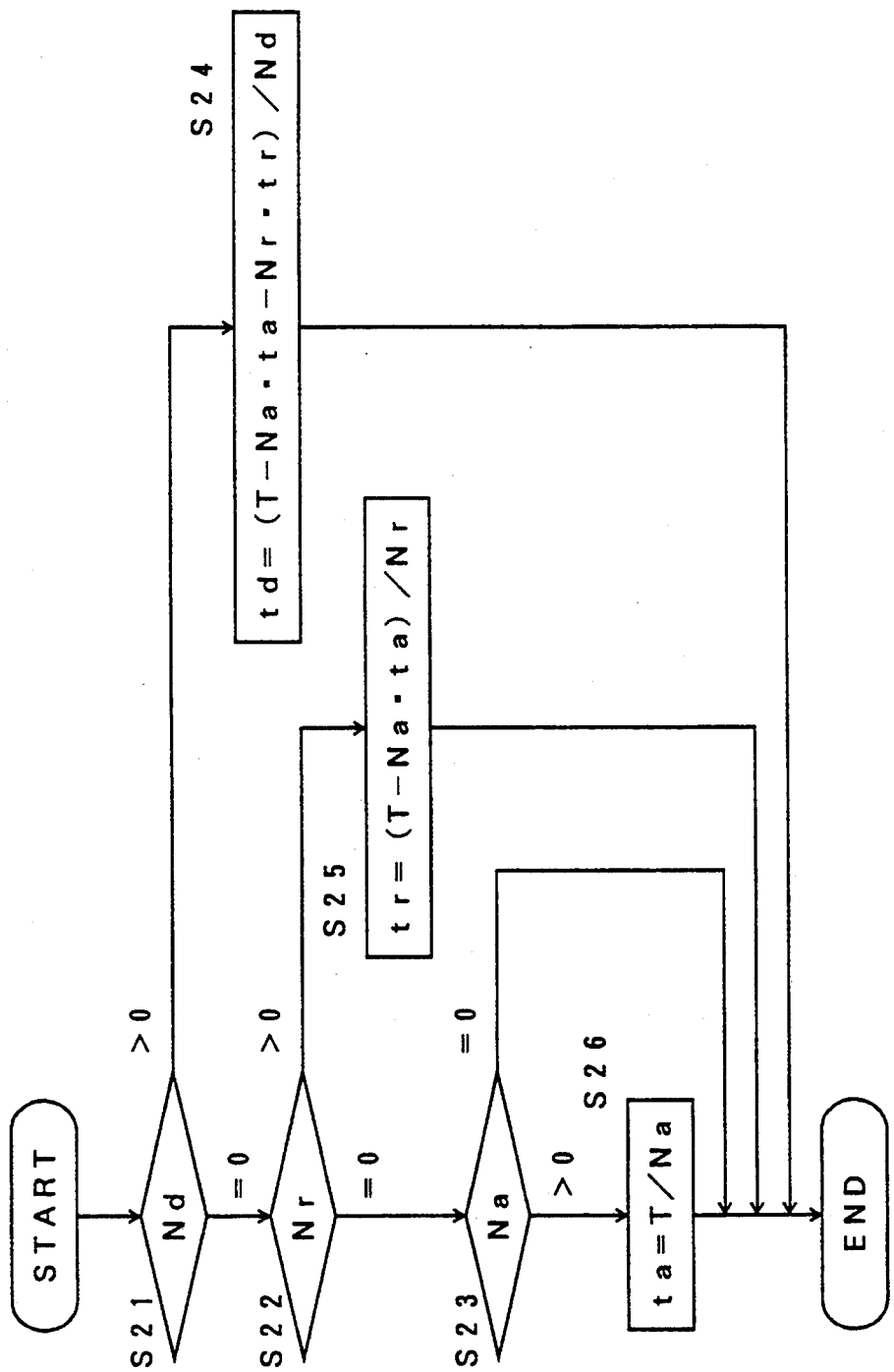
FIG. 10 is a flowchart of a process for calculating the average processor operation times.

FIG. 10 is a flowchart of the process for calculating the average operation times ta, tr and td. The monitor unit 33, more particularly, the controller 43 shown in FIG. 9 measures, at predetermined intervals of, for example, 4 seconds, the total processor operation time T, the number of times that the call accepting, rejecting and discarding processes are carried out in the 4-second cycle. In step S21 shown in FIG. 10, the controller 43 determines whether or not Nd is equal to zero. When Nd is equal to zero, that is, the call discarding process was not executed, the controller 43 determines whether or not Nr=0 in step S22. When Nr=0, that is, the call rejecting process was not executed, the controller 43 determines, in step S28, whether or not Na=0. When Na=0, the process shown in FIG. 10 is ended.

When Nd=0, Nr=0, and Na>0, only the call accepting process is carried out, and the average processor operation time ta per call is calculated using the aforementioned expression in step S26. When Nd=0 and Nr>0, the average processor operation time tr per call is calculated using the aforementioned expression in step S25. When Nd>0, the average processor operation time td per call is calculated using the aforementioned expression in step S24. It will be noted that the average processor operation times ta, tr and td can be obtained without solving the simultaneous equations and hence the load of the monitor unit 33, particularly the controller 43 can be deduced.

Figure 11:
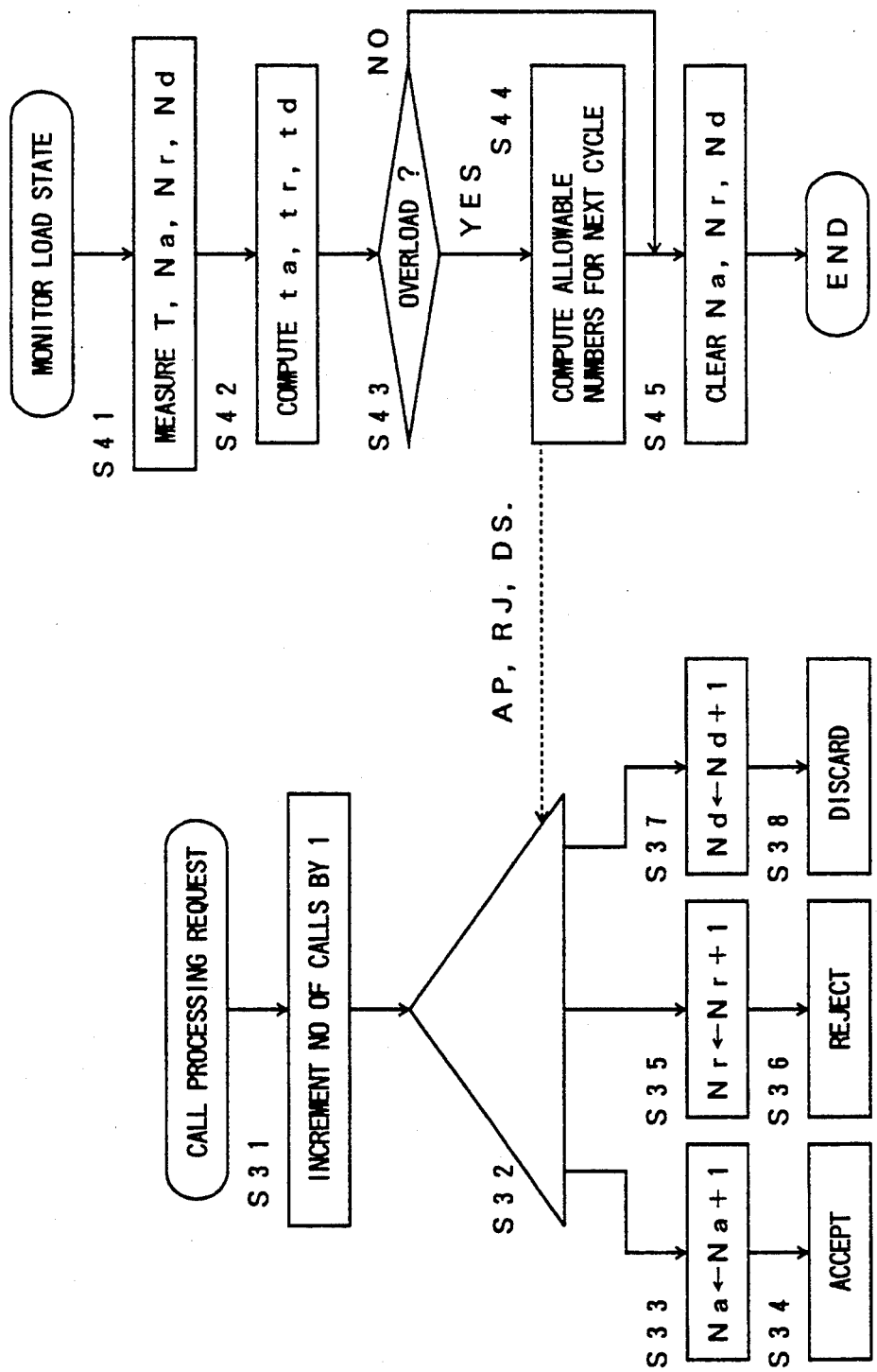
FIG. 11 is a flowchart showing the operation of a CPU shown in FIG. 9 and the operation of a controller shown in FIG. 9.

FIG. 11 is a flowchart of the call regulation process using the average processor operation times ta, tr and td. In step S31, the CPU 42 receives a call (a request for call processing) and increments an internal counter indicating the number of incoming calls by 1. In step S32, the CPU 42 receives, from the controller 43 of the monitor unit 33, data indicating the ratio of the call accepting process, the ratio of call rejecting process and the ratio of call discarding process, which are now written as AP, RJ and DS, respectively. When the call accepting process is selected, in step S33 the CPU 42 increments, by 1, the value of an internal counter indicating the number Na of times that the call accepting process is executed. In step S34, the call accepting process is carried out. When the call rejecting process is selected, in step S35 the CPU 42 increments, by 1, the value of an internal counter indicating the number Nr of times that the call accepting process is executed. In step S36, the call rejecting process is carried out. In step S36, the CPU 42 sends a busy tone signal or a message to a station which generates a call or a low-order station, and informs it that the request for call processing cannot be accepted. When the call discarding process is selected, in step S37 the CPU 42 increments, by 1, the value of an internal counter indicating the number Nd of times that the call discarding process is executed. In step S38, the call discarding process is carried out. That is, the call is discarded without sending the busy tone signal or message.

In step S41, the controller 43 periodically measures the total processor operation time T, and the numbers Na, Nr and Nd of times that the call accepting, rejecting and discarding processes are carried out. The parameters Na, Nr and Nd are obtained in steps S33, S34 and S35, respectively. The total processor operation time T can be measured by measuring the total rest time of the CPU 42 within a predetermined period equal to, for 4 seconds. In step S41, the controller 43 calculates the average processor operation times ta, tr and td in the aforementioned manner. In step S43, the controller 43 determines whether or not the CPU42 is in an overload state. When Nr>0, Nd>0 or T>X, in step S44 the controller 43 determines that the CPU 42 is in the overload state, and informs the CPU 42 of the ratios AP, RJ and RD of the call accepting, rejecting and discarding processes. In step S45, the controller 43 resets the number of times Na, Nr and Nd to zero. When it is determined, in step S43, that the CPU 42 does not have an overload, the step S45 is also executed.

In the embodiment of the present invention, three types of call processing are used. However, it is also possible to employ more than three types of call processing.

Figure 12:
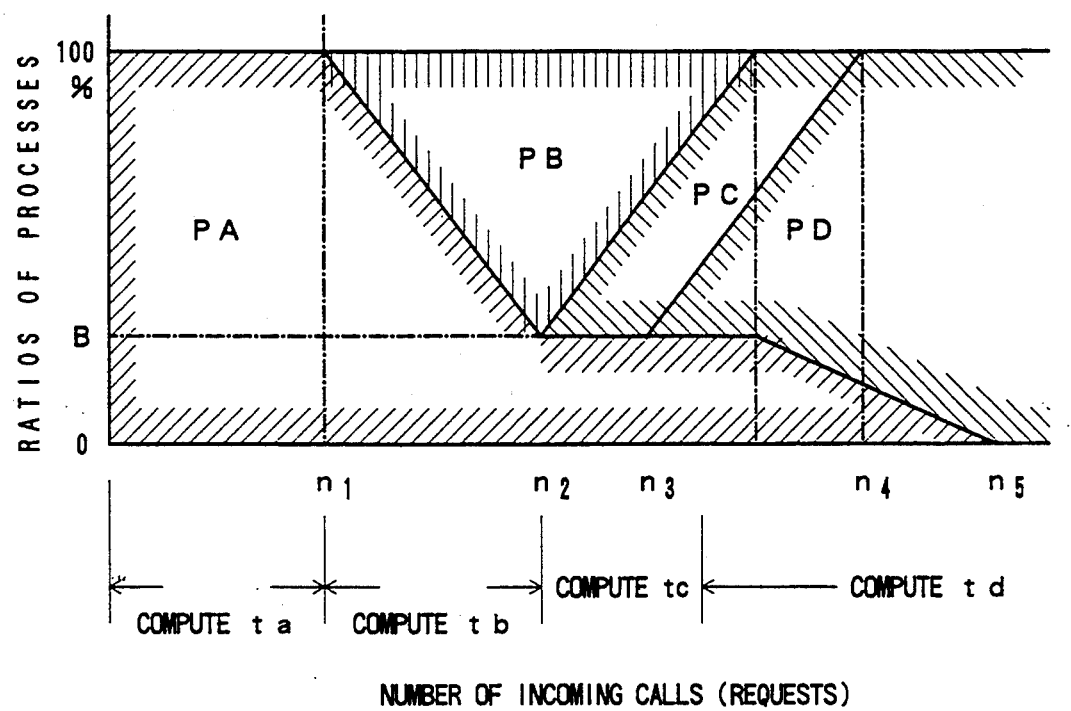
FIG. 12 is a diagram showing how incoming calls are processed by the procedure shown in FIG. 11.

FIG. 12 shows four different types of call processing PA, PB, PC and PD. The total processor operation time T and the numbers Na, Nb, Nc and Nd of times that the processes PA, PB, PC and PD are respectively carried out. When the number of incoming calls is equal to or smaller than n1, only the process PA is executed. During this time, an average processor operation time ta per call (necessary to complete the process PA for a call) is calculated using such an expression that ta=T/Na. When the number of incoming calls exceeds n1, the process PB is started in addition to the process PA. By using the latest average processor operation time ta, an average processor operation time tb per call (necessary to complete the process PB for a call) is calculated using such an expression that tb=(T−Na·ta)/Nb.

When the number of incoming calls exceeds N2, the process PC is started in addition to the processes PA and PB. By using the latest average processor operation times ta and tb, an average processor operation time tc per call (necessary to complete the process PC for a call) is calculated using such an expression as tc=(T−Na·ta−Nb·tb)/Nc. When the number of incoming calls exceeds 3, the process PD is started in addition to the processes PA, PB and PC. By using the latest average processor operation times ta, tb and tc, an average processor operation time td per call (necessary to complete the process PD for a call) is calculated using such an expression as td=(T−Na·ta−Nb·tb−Nc·tc)/Nd.

Figure 13:
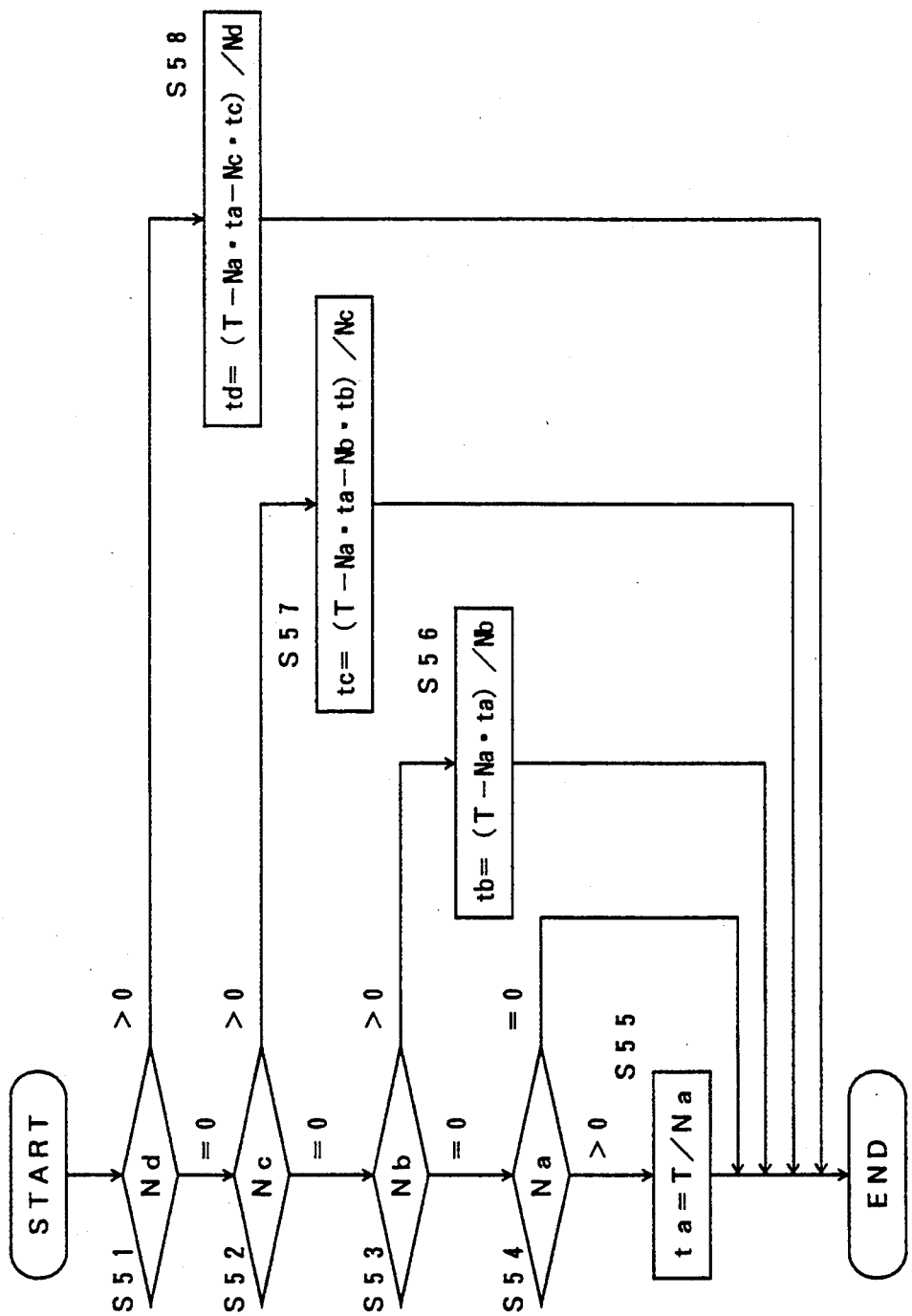
FIG. 13 is a flowchart showing a process for calculating average processor operation times in a case where four different types of processes are employed.

FIG. 13 is a flowchart of a process for calculating the average processor operation times ta, tb, tc and td. When it is determined, in steps S51–S54, that Nd=0, Nc=0, Nb=0 and Na=0, the controller 43 of the monitor unit 33 ends the process shown in FIG. 13. When it is determined that Nd=0, Nc=0, Nb=0, and Na>0, the controller 43 calculates the average processor operation time ta (=T/Na) in step S55.

When it is determined that Nd=0, Nc=0 and Nd>0, in step S56 the controller 43 calculates tb (=(T−Na·ta)/Nb) using the average processor operation time ta in the latest cycle. When it is determined that Nd=0, and Nc>0, in step S57 the controller 43 calculates tc (=(T−Na019 ta−Nb·tb)Nc) by using the average processor operation times ta and tb in the latest cycle. When it is determined that Nd>0, in step S58 the controller 43 calculates td (=(T−Na·ta−Nb·tb−Nc·tc)/Nd) by using the average processor operation times ta, tb and tc in the latest cycle.

The average processor operation time tm of the mth type of process is obtained by the following expression:

$$tm = \left(T - \sum_{i=1}^{m-1} Ni \cdot ti\right)/Nm$$

where Ni (i=1, 2, ..., m−1) denotes the number of times that the ith type of processes are executed in a cycle, and ti denotes an average processor operation time necessary to execute the ith type of process one time.

In the above-mentioned manner, it is possible to obtain the average processor operation times without solving the simultaneous equations of the fourth order. It can be seen from the above that more than four parameter values can be easily obtained without solving simultaneous equations.

The present invention is suitable for an AIN (Advanced Intelligent Network) system. The AIN system comprises a service control point and a plurality of service switching points, which are connected to the service control point via a signal transfer point.

Figure 14:
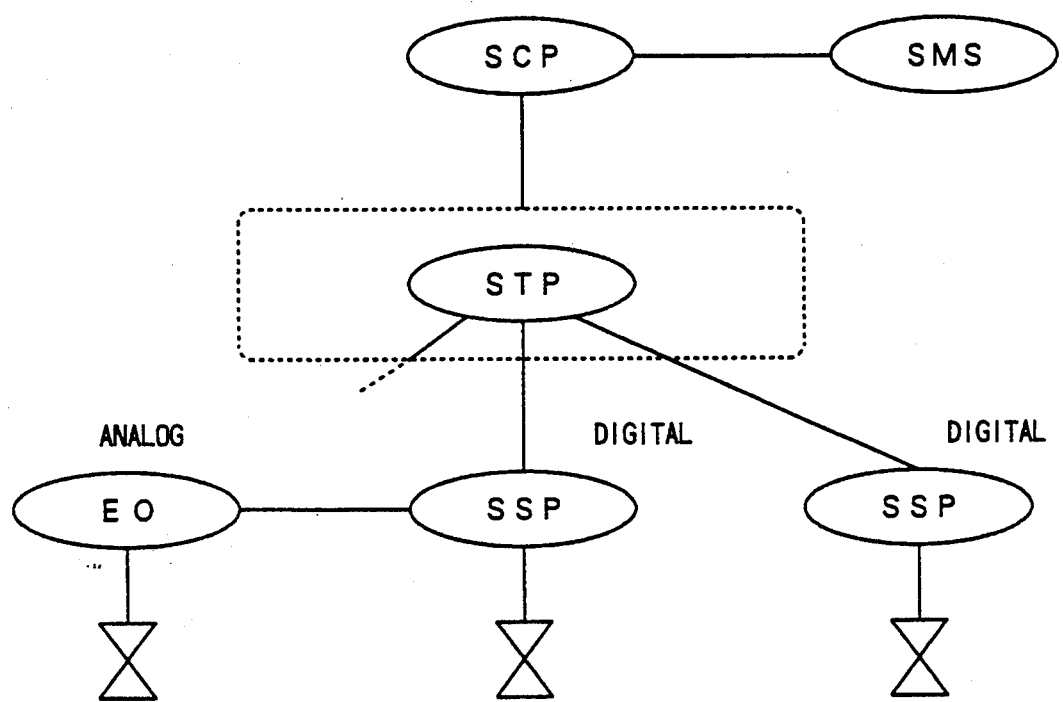
FIG. 14 is a block diagram of a communications network to which the present invention is applied.

FIG. 14 is an AIN system, which comprises a service control point SCP, service switching points SSP, and a signal transfer point STP, which connects the service control point SCP and the service switching points SSP. The signal transfer point STP, remote from the signal switching points SSP, is included in a common signal line network. Terminals are connected to the switching service points SSP. In FIG. 14, an end office, to which terminals are connected, is connected to one of the service switching points SSP. A service management system SMS is connected to the service control point SCP. The service control point SCP has a database commonly used for the service switching points SSP. Further, the service control point sCP has a concentrated service control related to the service switching points SSP. The present invention is installed in the service control point SCP.

When a terminal connected to one of the service switching points SSP generates a call, the service switching point SSP sends a request for call processing to the service control point SCP via the signal transfer point STP. The above request is applied to the processor 31 shown in FIG. 5, more particularly the call receiving unit 41 shown in FIG. 9. The network 30 shown in FIG. 5 or FIG. 9 corresponds to one of the service switching points SSP. In response to receipt of the request, the service control point SCP executes, fop example, the call accepting process, in which the service switching point or points SSP are controlled by the service control point SCP via the signal transfer point STP.

The present invention is not limited to the specifically disclosed embodiments, and variations and modifications may be made without departing from the scope of the present invention.

What is claimed is:

1. A load control system having m types of processes provided for processing requests of an identical request type where m is an integer equal to or greater than 3; said load control system comprising:

load processing means for executing one of said m types of processes in response to the processing requests;

monitor means coupled to said load processing means, for monitoring a load of said load processing means; and execution ratio calculation means, coupled to said load processing means and said monitor means, for determining execution ratios of the m types of processes according to a predetermined priority order so that the load of said load processing means is equal to or lower than a first reference value and an execution ratio of at least one of the m types of processes is equal to or higher than a second reference value so as to ensure that said load processing means executes said at least one of the m types of processes at an execution ratio equal to or higher than said second reference value.

2. The load processing system as claimed in claim 1, wherein:

said monitor means comprises first means for monitoring a total operation time of said load processing means in a cycle and the numbers of times that the m types of processes are respectively executed in said cycle; and said execution ratio calculation means comprises second means for calculating the execution ratios of the m types of processes on the basis of the total operation time of said load processing means and the number of times that the m types of processes are respectively executed in said cycle.

3. The load processing system as claimed in claim 1, wherein:

said monitor means comprises first means for monitoring total-operation times of said load processing means in m cycles and the numbers of times that the m types of processes are respectively executed in each of the m cycles; and said execution ratio calculation means comprises second means for calculating average operation times of said load processing means for the m types of processes and for calculating the execution ratios of the m types of processes using the average operation times of the load processing means for the m types of processes.

4. The load processing system as claimed in claim 1, wherein:
said monitor means comprises first means for monitoring a total operation time T of said load processing means in a cycle and the numbers of times that the m types of processes are respectively executed in said cycle, and
wherein said execution ratio calculation means comprises:
second means for calculating an average operation time tm of said load processing means necessary to execute an mth type of processes one time by using the following expression:

$$tm = \left( T - \sum_{i}^{m-1} Ni \cdot ti \right) / Nm$$

where Ni (i=1, 2, ..., m−1) denotes the number of times that an ith type of processes are executed in said cycle, and ti denotes an average operation time of said load processing means necessary to execute an ith type of processes one time.

5. The load control system as claimed in claim 1, wherein said at least one of the m types of processes has a highest priority over other ones of the m types of processes.

6. An exchange system having m different types of call processes provided for call processing requests where m is an integer equal to or greater than 3, said exchange system comprising:
load processing means for executing one of said m types of call processes in response to the call processing requests;
monitor means, coupled to said load processing means, for monitoring a load of said load processing means on the basis of the load of said load processing means; and
execution ratio calculation means, coupled to said load processing means and said monitor means, for determining execution ratios of the m types of call processes according to a predetermined priority order so that the load of said load processing means is equal to or lower than a first reference value and an execution ratio of at least one of the mtypes of call processes is equal to or higher than a second reference value so as to ensure that said load processing means executes at least one of the m types of call processes at an execution ratio equal to or higher than said second reference value.

7. The exchange system as claimed in claim 6, wherein:
said monitor means comprises first means for monitoring a total operation time of said load processing means in a cycle and the numbers of times that the m types of call processes are respectively executed in said cycle; and
said execution ratio calculation means comprises second means for calculating the execution ratios of the m types of call processes on the basis of the total operation time of said load processing means and the number of times that the m types of call processes are respectively executed in said cycle.

8. The exchange system as claimed in claim 6, wherein:
said monitor means comprises first means for monitoring total operation times of said load processing means in m cycles and the numbers of times that the m types Of call processes are respectively executed in each of the m cycles; and
said execution ratio calculation means comprises second means for calculating average operation times of said load processing means for the m types of call processes and for calculating the execution ratios of the m types of call processes using the average operation times of the load processing means for the m types of call processes.

9. The exchange system as claimed in claim 6, wherein:
said monitor means comprises first means for monitoring a total operation time T of said load processing means in a cycle and the numbers of times that the m types of call processes are respectively executed in said cycle, and
wherein said execution ratio calculation means comprises:
second means for calculating an average operation time tm of said load processing means necessary to execute an mth type of call processes one time by using the following expression:

$$tm = \left( T - \sum_{i=1}^{m-1} Ni \cdot ti \right) / Nm$$

where Ni (i=1, 2, ..., m−1) denotes the number of times that an ith type of call processes are executed in said cycle, and ti denotes an average operation time of said load processing means necessary to execute an ith type of call processes one time.

10. The exchange system as claimed in claim 6, wherein:
the m types of call processes comprises a call accepting process, a call rejecting process, and a call discarding process;
the call rejecting process rejects the call processing requests after notifying stations which generate the call processing requests that the call processing requests cannot be accepted; and
the call discarding process discards the call processing requests without notifying stations which generate the call processing requests that the call processing requests cannot be accepted.

11. The exchange system as claimed in claim 10, wherein the call accepting process has priority over the call rejecting process and the call discarding process.

12. The exchange system as claimed in claim 10, wherein said load processing means executes only the call accepting process so that the load of the load processing means is equal to or lower than the first reference level.

13. The exchange system as claimed in claim 10, wherein said load processing means executes the call accepting process and the call rejecting process with the execution ratios of the call accepting process and the call rejecting process determined by said execution ratio calculation means.

14. The exchange system as claimed in claim 10, wherein said load processing means executes the call accepting process, the call rejecting process and the call discarding process with the execution ratios of the call accepting process, the call rejecting process and the call discarding process determined by said execution ratio calculation means.

15. The exchange system as claimed in claim 10, wherein said load processing means executes the call accepting process and the call discarding process with the execution ratios of the call accepting process and the call discarding process determined by said execution ratio calculation means.

16. The exchange system as claimed in claim 6, further comprising switching network means for switching signals related to the call processing requests, said switching network means being located in a station remote from said load processing means.

* * * * *